United States Patent [19]
Schmidt et al.

[11] Patent Number: 5,682,416
[45] Date of Patent: Oct. 28, 1997

[54] METHOD AND APPARATUS COMMUNICATION HANDOVER IN A COMMUNICATION SYSTEM

[75] Inventors: Chris Schmidt, Wheaton; Michael D. Kotzin, Buffalo Grove; Barry J. Menich, Schaumburg; Eugene J. Bruckert, Arlington Heights, all of Ill.

[73] Assignee: Motorola, Inc., Schaumburg, Ill.

[21] Appl. No.: 437,765

[22] Filed: May 9, 1995

[51] Int. Cl.⁶ .............. H04M 11/00; H04Q 7/00; H04B 15/00
[52] U.S. Cl. .............. 379/58; 379/58; 379/59; 379/60; 455/33.2; 455/63
[58] Field of Search .............. 379/57, 58, 59, 379/60, 61, 62, 63, 84; 455/33.2, 33.3, 33.4, 67, 63

[56] References Cited

U.S. PATENT DOCUMENTS

| | | |
|---|---|---|
| 4,398,063 | 8/1983 | Hass et al. . |
| 4,972,456 | 11/1990 | Kaczmarek et al. . |
| 5,036,531 | 7/1991 | Spear . |
| 5,101,501 | 3/1992 | Gilhousen et al. . |
| 5,136,584 | 8/1992 | Hedlund . |
| 5,146,609 | 9/1992 | Tayloe et al. ............ 455/33.2 |
| 5,168,498 | 12/1992 | Adams et al. . |
| 5,184,347 | 2/1993 | Farwell et al. ............ 370/94.1 |
| 5,228,029 | 7/1993 | Kotzin . |
| 5,260,987 | 11/1993 | Mauger . |
| 5,278,892 | 1/1994 | Bolliger et al. . |
| 5,291,544 | 3/1994 | Hecker . |
| 5,305,308 | 4/1994 | English et al. . |
| 5,343,513 | 8/1994 | Kay et al. . |
| 5,363,369 | 11/1994 | Hemmady et al. . |
| 5,386,456 | 1/1995 | Schatz et al. ............ 379/60 |
| 5,444,766 | 8/1995 | Farwell et al. ............ 370/60 |
| 5,471,644 | 11/1995 | Schatz et al. ............ 379/60 |
| 5,475,686 | 12/1995 | Bach et al. ............ 370/84 |
| 5,537,610 | 7/1996 | Mauger et al. ............ 379/58 |

FOREIGN PATENT DOCUMENTS

| | | |
|---|---|---|
| 421535A1 | 4/1991 | European Pat. Off. . |
| 536544A2 | 7/1992 | European Pat. Off. . |
| 4-49733 | 2/1992 | Japan . |

*Primary Examiner*—Curtis Kuntz
*Assistant Examiner*—Binh K. Tieu
*Attorney, Agent, or Firm*—Richard A. Sonnentag

[57] ABSTRACT

A method of communication handover from a first communication entity (33) to a second communication entity (43) in a communication system (10) where a communication unit (80), communicating with a transceiver (23) associated with the second communication entity, is linked to the first communication entity. The invention provides for establishing a communication link between the communication unit and the second communication entity while maintaining a communication link between the communication unit and the first communication entitiy. Then, communications are substantially simultaneously transfered to the second communication entity while terminated from the first communication entity.

22 Claims, 4 Drawing Sheets

METHOD AND APPARATUS COMMUNICATION HANDOVER IN A COMMUNICATION SYSTEM

RELATED APPLICATIONS

This application is related to the following commonly assigned U.S. patent applications: Ser. No. 08/161,294 filed Dec. 2, 1993 and Ser. No. 08/123,615 filed Sep. 17, 1993, the disclosures of which are hereby expressly incorporated herein by reference.

FIELD OF THE INVENTION

The present invention relates generally to communication systems, and more particularly, to a method and appartus for handing over communications within a communication system.

BACKGROUND OF THE INVENTION

Communication systems are well known and consist of many types including land mobile radio, cellular radiotelephone, personal communication system (PCS), and other communication system types. For example, in cellular radiotelephone communication systems, a number of communication cells, serviced by base transceiver stations (BTS), are typically linked to a base station controller (BSC). The BSCs are, in turn, linked to mobile switching centers (MSCs) which provide a connection between the cellular radiotelephone communication system and the public switched telephone network (PSTN) as well as interconnection of various cellular radiotelephone communication systems. Mobile communication units operating within the communication cells utilize radio communications to transmit and receive signals with one or more serving BTSs. The signals are processed by the BTSs, BSC and MSC to complete a communication transaction with a land line telephone user connected to the PSTN or to another mobile.

One particular type of cellular radiotelephone communication system is referred to as a code division multiple access (CDMA) cellular radiotelephone communication system. In CDMA systems a transcoding function is provided by way of a device known as a transcoder. The transcoder exchanges speech information, typically in the form of a frame of coded information, with voice coding devices, e.g., vocoders in the mobile or BTS and other communication network devices in the system, e.g., the MSC or PSTN. The transcoder eliminates copies of duplicate speech information, i.e. duplicate frames of information it may receive from multiple BTSs, or produces copies of speech information for simultaneous communication to a communication unit through multiple BTSs. The transcoder also informs the various network elements when it receives bad or corrupted speech information.

Figure 2:
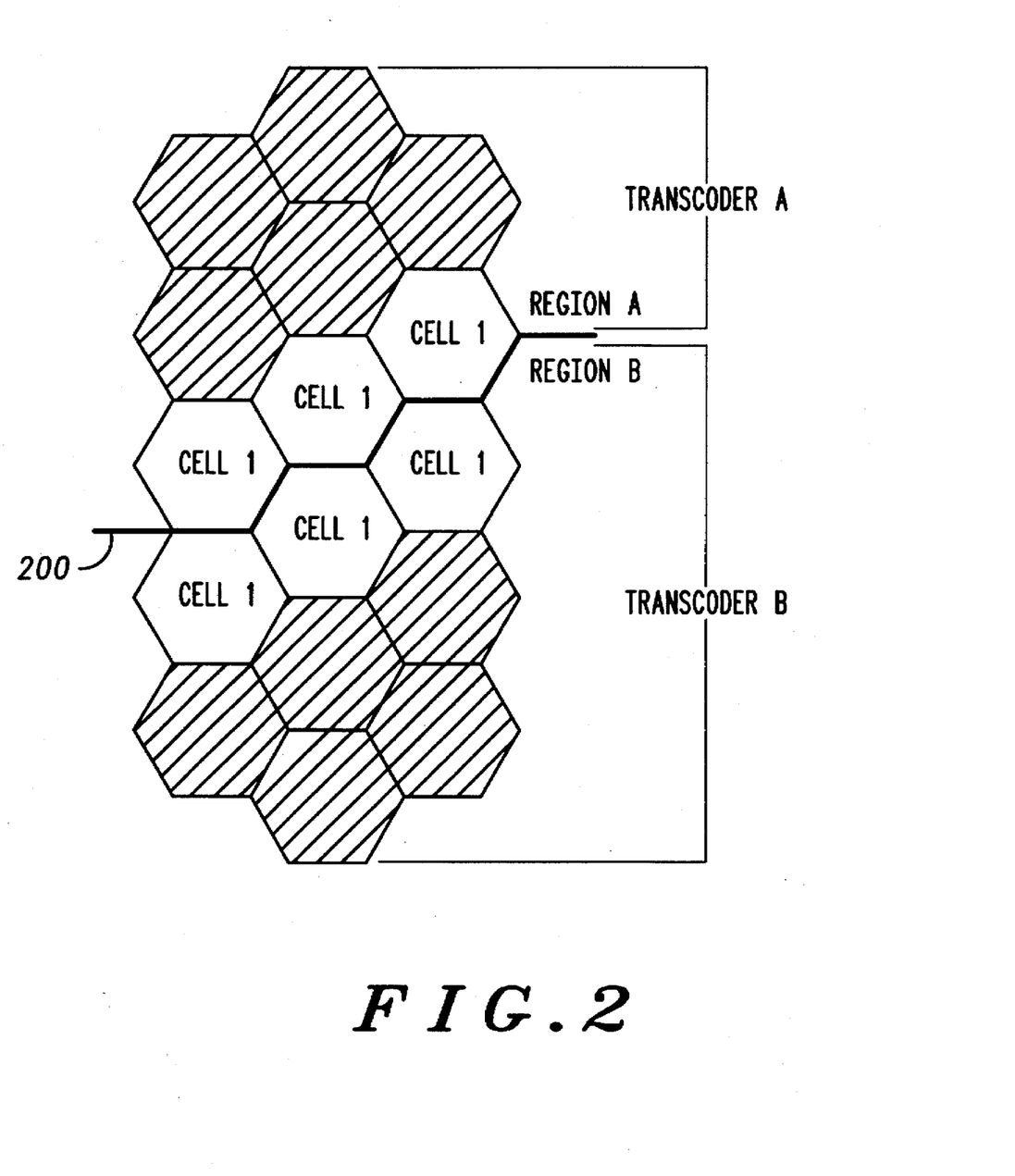
FIG. 2 is a cellular coverage diagram for a cellular radiotelephone communication system.

A limitation of the transcoder is that it is limited in the number of communication channels it can service. Hence, a single transcoder can only service a limited number of communication cells. To provide a sufficient number of communication cells with a sufficient number of communication channels per cell, multiple transcoder entities are required. In such a system architecture, seams form between cells which are supported by separate transcoders. Such a seam 200 is illustrated in FIG. 2 between cells, e.g., cell 1 and cell 4, supported by separate transcoder entities. This system structure leads to the difficulty of transferring communications control and call processing from the first transcoder to the second transcoder without disrupting service to the communication unit, when the communication unit moves from a cell supported by one transcoder to a cell supported by another transcoder, e.g., from cell 1 to cell 4.

A common approach for transferring communication from the first transcoder to the second transcoder is known as hard handover. In hard handover, the communication transaction is terminated with the first transcoder, the communication unit is instructed to change to a completely new set of communication channels and the communication transaction is restructured under the second transcoder. This approach results in an unacceptable disruption in the transmission between the communication unit and the transcoder which results in disruption of the audio signals to and from the communication unit.

Several methods and apparatus for providing a softer handover of communication between the transcoders are described in the aforementioned commonly assigned U.S. Patent Applications. Each of these applications teach apparatus and methods for first linking the transcoders such that information may be shared therebetween. Once linked, the transcoder operations may be coordinated such that a smooth handover is accomplished without adversely disrupting the service to the communication unit.

It would be desirable, however, to avoid forming an inter-transcoder link to simplify the soft handover function and minimize the potential for introducing additional delay into the communication paths. Thus, there is a need for a method of transferring communications between transcoders in a communication system without linking the transcoders during soft handover.

DETAILED DESCRIPTION OF THE PREFERRED EMBODIMENT(S)

The present invention provides a method and apparatus for handover of communication between communication entities, e.g., transcoders, base station controllers, mobile switching centers, and the like, without prior linking of the communication entities. A communication link is maintained between a communication unit and a first entity while a second, muted communication link is established between the communication unit and a second entity. Upon establishing the second communication link, and at a mutually determined time reference, the first communication link is muted while the second communication link is activated. In this manner, communication is transferred from the first entity to the second entity without significant disruption in service to the communication unit and without linking the entities.

Figure 1:
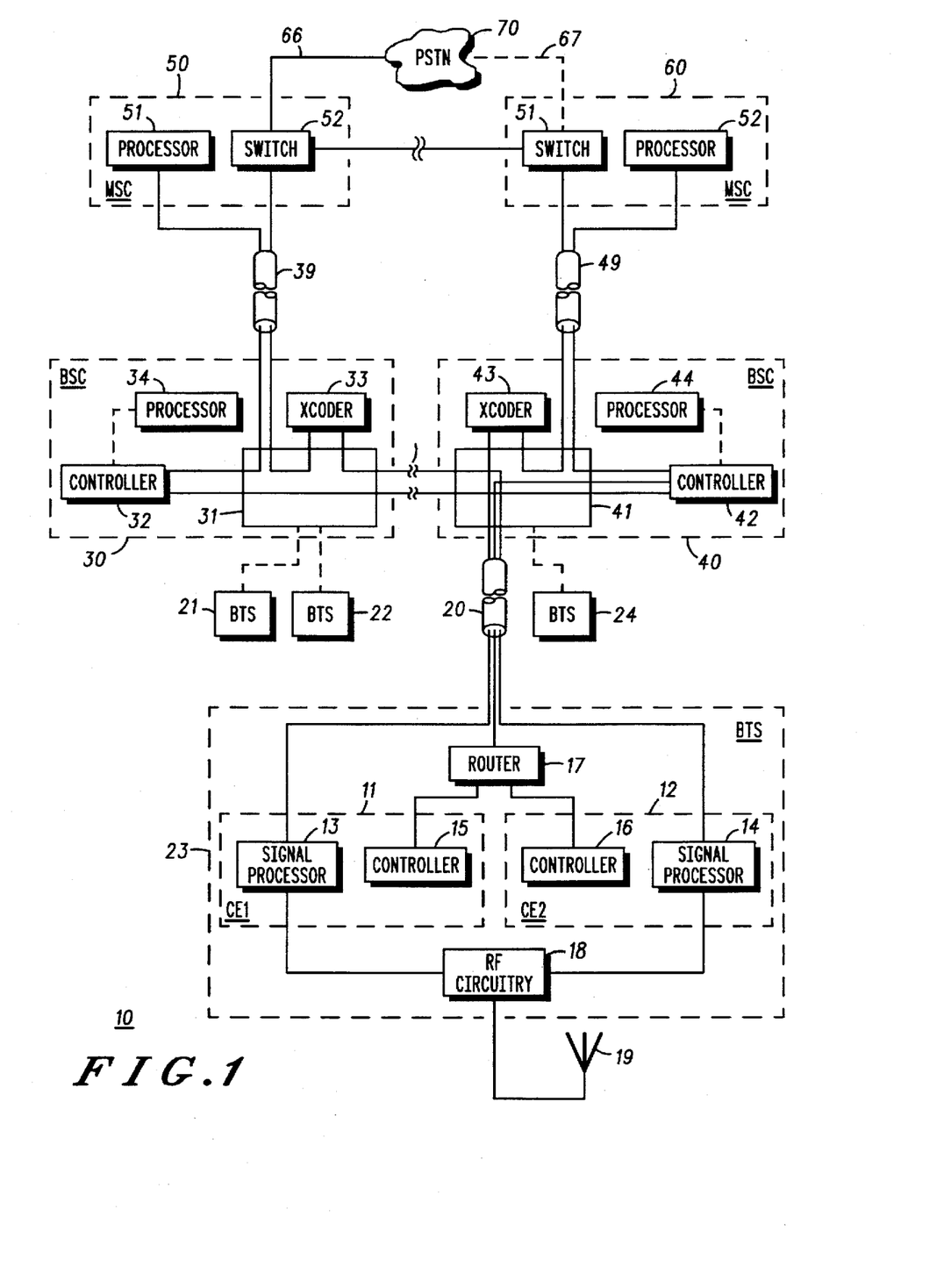
FIG. 1 is block diagram of an exemplary cellular radiotelephone communication system for use in conjunction with the method of the present invention.

Referring to FIG. 1, cellular radiotelephone system 10 includes a plurality of BTSs 21–24 which make up the base station system (BSS) and are serviced by BSCs 30 and 40. BSCs 30 and 40 are coupled to MSCs 50 and 60 which in turn are coupled to the PSTN 70.

In a preferred implementation, each BTS 21–24 includes, as shown for BTS 23, a signal router 17, first and second signal processors 13 and 14, respectively, and first and second control processors 15 and 16, respectively, which typically form first and second channel elements 11 and 12, respectively. Communication signals to and from channel elements 11 and 12 are communicated to appropriate RF circuitry 18, e.g., filters, signal splitters/combiners, RF transceivers, power amplifiers, etc., for implementing an air interface between the BTS and a mobile communication unit (mobile) 80 via antenna system 19. BTSs 21–24 are coupled to an associated BSC 30 or 40 by, typically, a T1 span line 20. Uplink and downlink communication signals as well as embedded control signals are communicated between the BSCs 30 and 40 and the BTSs 21–24 via T1 span line 20.

The BSCs 30 and 40 provide BSS control and transcoding functions. With continued reference to FIG. 1, each BSC 30 and 40 includes a transcoder 33 and 43, respectively, and processor 34 and 44, respectively. Transcoders 33 and 43 are each linked to a controller 32 and 42 and switches 31 and 41, respectively. Controllers 32 and 42, respectively, provide real time control, handover and radio channel assignment functions for the BTSs subtended to the BSC. They also provide fault management functions and act as an interface to an operations and maintenance center (OMC) (not shown). Furthermore, controllers 32 and 42 provide a control function to switches 31 and 41.

Switches 31 and 41 provide interfaces from the transcoders 33 and 43 to the terrestrial circuits 39 and 49 for coupling to MSCs 50 and 60, respectively. They also provide interfaces from the transcoders 33 and 43 for establishing communication/traffic channels to BTSs 21–24. Moreover, switches 31 and 41 also provide a means for linking the BSCs 30 and 40 via communication link 25.

Within BSCs 30 and 40, transcoders 33 and 43 convert between a digital voice encoding scheme, such as code excited linear predictive (CELP) coding, and standard pulse code modulated (PCM) coding used within PSTN 70. BSCs 30 and 40 provide for completing fixed connections for configuring the communication system as well as for providing dynamic connections for establishing radio channels between the BTSs 21–24 and transcoders 33 and 43 and likewise from transcoders 33 and 43 to mobile 80 and MSCs 50 and 60.

MSCs 50 and 60 each include processors 51 and 61, respectively, and switching matrices 52 and 62, respectively. MSCs 50 and 60 perform the functions typical of MSCs in cellular radiotelephone communication systems, and under control of processors 51 and 61, provide switching of voice and data circuits, via switches 52 and 62, respectively, to PSTN 70 via communication trunks 66 and 67, respectively and between MSCs via, for example, communication trunk 65.

Figure 3A:
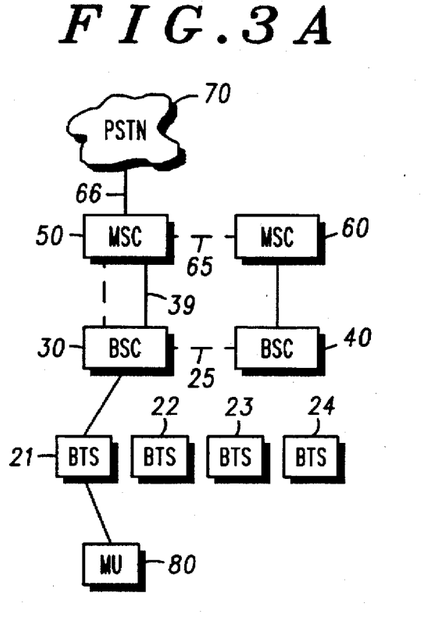
FIGS. 3A–3H are block diagrams illustrating communication control handover in accordance with a preferred embodiment of the present invention.

Referring now to FIGS. 3A–3G, like reference numerals being used to refer to like elements discussed in reference to FIG. 1, a mobile 80 is shown connected with MSC 50 via a communication channel with BTS 21, BSC 30 and a communication link between BSC 30 and MSC 50, BTS 21 being serviced by BSC 30 (FIG. 3A). Transcoding function is performed by transcoder 33 located at BSC 30 and the coded communication from mobile communication unit (mobile, MU in FIGS. 3A–3G) 80 is routed to MSC 50 via circuit 39. For purposes of discussion, mobile 80 is traveling in a direction taking it from the coverage area of BTS 21 to the coverage area of BTS 22. As mobile 80 moves nearer to the coverage area of BTS 22, it detects that it can now receive a pilot channel, with acceptable signal strength, from BTS 22 and reports this information to BSC 30. Note that BTS 22 is also serviced by BSC 30.

Figure 3B:
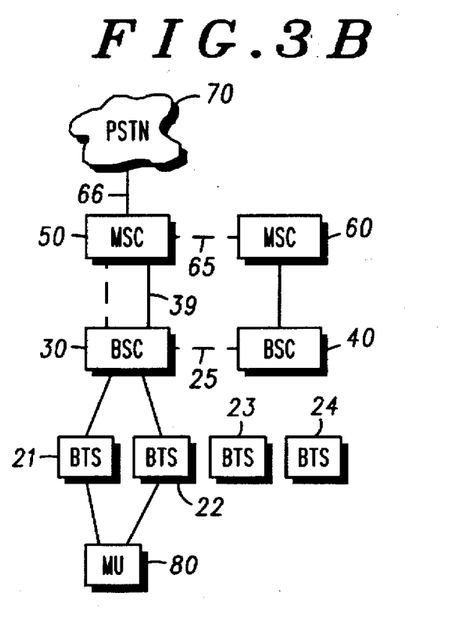

When mobile 80 is able to receive an acceptable signal from BTS 22, BSC 30 determines that a soft handover mode should be initiated. In soft handover mode, a radio channel is established between mobile 80 and BTS 22 (FIG. 3B). The present invention is described, in exemplary fashion, in terms of a CDMA cellular radiotelephone communication system in which a radio channel comprises a radio interface between the mobile unit and the BTSs. Information is modulated in a known manner onto the radio interface through the use of a spreading code, often referred to as a Walsh Code. The radio channel between mobile 80 and BTS 21 remains unchanged, and a communication link is established between BTS 22 and BSC 30. The communication signals from both BTS 21 and 22 are routed to transcoder 33 and it operates, under suitable selection/combining control, to select one of the two signals or combine them for transcoding and communication to MSC 50 via circuit 39 which remains unchanged.

Figure 3C:
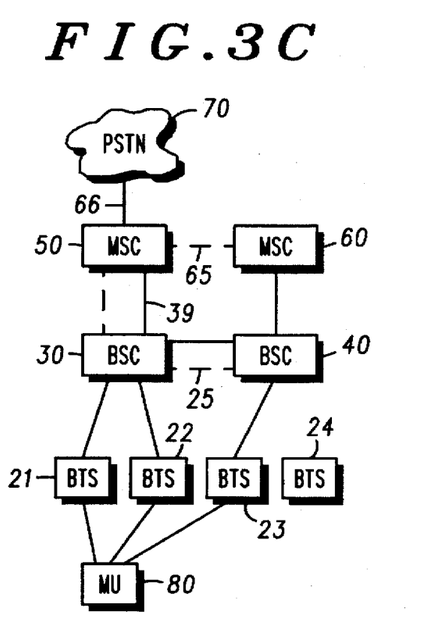

Referring now to FIG. 3C, mobile 80 continues to move away from the coverage area of BTS 21 and towards the coverage area of BTS 23, and is fully within the coverage area of BTS 22. Similar to above, as mobile 80 moves nearer to the coverage area of BTS 23, it detects that it can now receive a pilot channel, with acceptable signal strength, from BTS 23 and reports this information to BSC 30. Note that BTS 23 is serviced by BSC 40.

When mobile 80 is able to receive an acceptable signal from BTS 23 and reports this information to BSC 30, BSC 30 determines that a soft handover mode should be initiated with BTS 23. At this point, mobile 80 is presently in soft handover mode with BTS 21 and 22. Also, BSC 30 may not be aware of the specific BTS, i.e., BTS 23, from which mobile 80 is reporting an acceptable signal strength, but it does recognize that the BTS is serviced by BSC 40.

With reference to FIG. 3C, BSC 30 allocates an inter-BSC circuit, via communication link 25, connecting switches 31 and 41 and further connects this link to transcoder 33. It should be appreciated by one of ordinary skill in the art that the inter-BSC link can be a physical circuit of appropriate capacity, or a logical circuit (e.g., packet switched circuit). Via controllers 32 and 42, BSC 30 queries BSC 40, using appropriate signaling on an inter-BSC signaling link portion of communication link 25, to determine if a soft handover mode can be supported by BSC 40. The query contains, among other things, the identity of the inter-BSC circuit allocated by BSC 30, the identity of the pilot channel on which mobile 80 reported an acceptable signal or, if known or determinable by BTS 22, the identity of BTS 23 or a sector of BTS 23, and the desire to establish a soft handover mode.

Upon receipt of the query, BSC 40 maps the pilot channel identity to the appropriate BTS, i.e., BTS 23, if BSC 30 did not report the identity to BSC 40 within the query, and determines if it can support the requested soft handover mode. If it can support the soft handover mode, BSC 40 establishes a communication link, e.g., allocates a radio channel from BTS 23 to mobile 80, and connects the radio channel to the inter-BSC circuit. Once BSC 40 connects the radio channel to the inter-BSC circuit, transcoder 33 at BSC 30 and BTS 23 are connected and can synchronize and time align to each other.

BSC 40 then sends a positive acknowledgment to BSC 30, and includes the identity of BTS 23 and the radio channel. Included in the positive acknowledgment, if necessary, is cell topology information known to BSC 40 but not known to BSC 30. This enables BSC 30 to correctly interpret reports from mobile 80 on the strength of scanned pilot channels, for example, if these pilot channels are transmitted by BTSs serviced by BSC 40, or by BTSs not serviced by BSC 40 but known to BSC 40 in its topology data base.

When BSC 30 receives the positive acknowledgment from BSC 40 it instructs BTS 23, via the inter-BSC signaling link, to start transmitting downlink to mobile 80 on the radio channel assigned by BSC 40, and to start receiving mobile 80 uplink transmission. BTS 23 sends a positive acknowledgment to BSC 30 when it has started transmitting downlink to mobile 80. Signaling transmitted between BSC 30 and BTS 23 may be routed through controller 42 at BSC 40, or by some other intermediate controller (not shown in FIG. 1).

BSC 30 now instructs mobile 80 to add the new radio channel to its active set, i.e., the set of radio channels on which it is presently communicating. Mobile communication unit 80 acquires the radio channel (i.e., the RF channel being transmitted by BTS 23) BTS 23 already has up and is transmitting. A full duplex voice circuit now exists between mobile 80 and transcoder 33 at BSC 30 via BTS 23 as well as via BTSs 21 and 22.

Figure 3D:
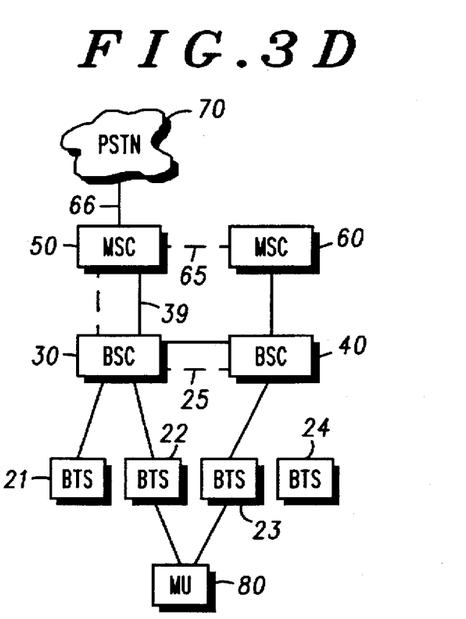

It will be appreciated by one of ordinary skill in the art, that at some point as mobile 80 moves nearer to the coverage area of BTS 23 and away from the coverage area of BTS 21, the signal between mobile 80 and BTS 21 may deteriorate to a point where it is no longer of acceptable quality. BSC 30 instructs mobile 80 to drop this communication links, thereby terminating the connection (FIG. 3D). It will be further appreciated that soft handover is a dynamic process and communication links between mobile 80 and various BTSs, such as an additional soft handover link to BTS 24, are continuously added and dropped during a communication transaction. Should the quality of the signal on the communication link between BTS 23 and mobile 80 drop below acceptable levels, BSC 30 will simply instruct mobile 80 to drop the communication link.

Figure 3E:
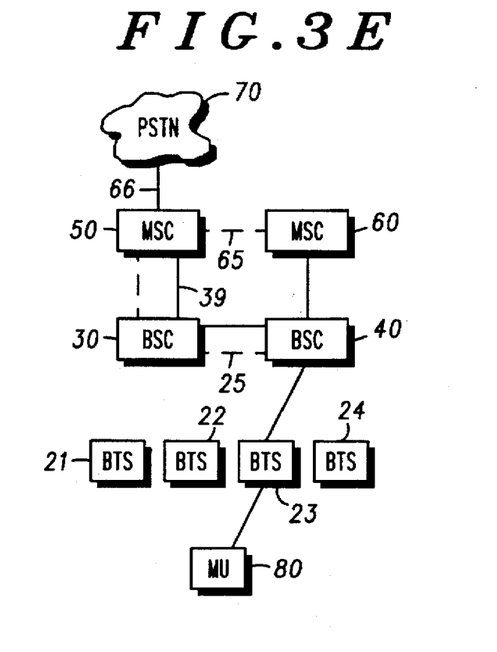
Figure 3F:
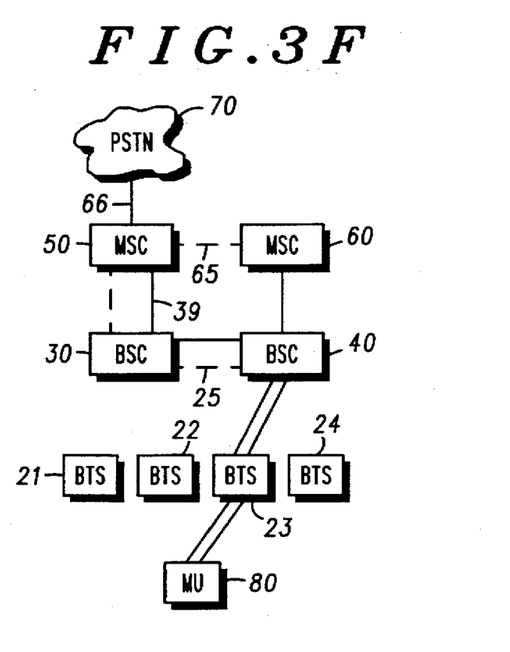
Figure 3G:
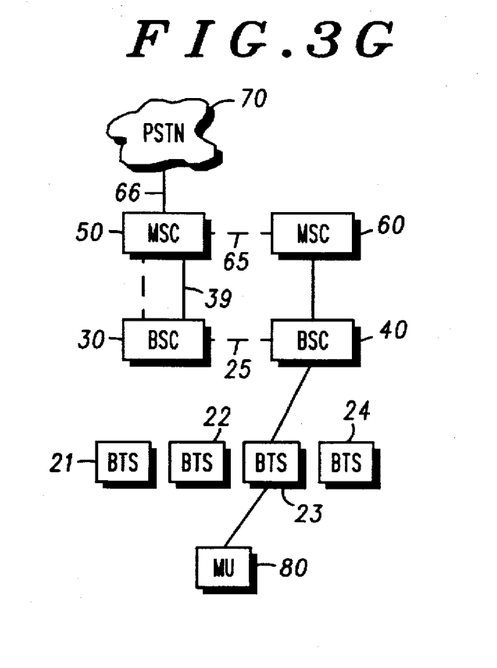
Figure 3H:
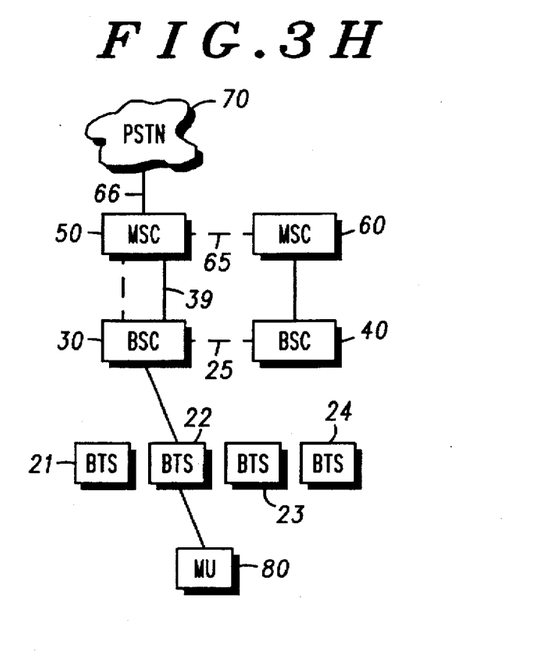

With reference to FIG. 3H, when mobile 80 acknowledges that the communication link has been dropped, BSC 30 determines that the radio channel assigned for this communication link is at BTS 23 serviced by BSC 40. BSC 30 instructs the transcoder 33 to deactivate the link to the radio channel, breaks the connection between the transcoder 33 and the inter-BSC circuit, and notifies BSC 40, via the inter-BSC signaling link, that it can release the radio channel and the inter-BSC circuit. BSC 40 instructs the radio channel to stop transmitting, and returns it to the free list, releases the inter-BSC circuit and returns it to the free list, and sends an acknowledgment to BSC 30. BSC 30 returns the inter-BSC circuit to it's free list. Note that either BSC 30 or BSC 40 could instruct the radio channel to stop transmitting, but in either case BSC 30 must inform BSC 40 that the radio channel can be idled and made available for another connection.

With reference once again to FIGS. 3D, it can be seen that mobile 80 is linked to both BTS 22 and BTS 23. As mobile 80 moves into the coverage area of BTS 23 and away from the coverage area of BTS 22, the quality of the signal between BTS 22 and mobile 80 may reach a point where BSC 30 instructs mobile 80 to drop the communication link to BTS 22. At this point, mobile 80 is no longer in communication with BTSs serviced by BSC 30 (FIG. 3E). Moreover, mobile 80 is not in a soft handover connection with any BTS serviced by BSC 30 or any other BSC other than BTSs serviced by BSC 40, i.e.. mobile 80 may be in a soft handover with other BTSs serviced by BSC 40. The routing of communications from BTS 23 to transcoder 33 via BSC 40, however, is not efficient. Therefore, a handover of transcoding functions from transcoder 33 to transcoder 43 is required.

The present invention is described in terms of communications handover from BSC 30 serviced by MSC 50 to BSC 40 serviced MSC 60. It should be understood that the teachings of the present invention are applicable to the case were the first and second BSCs are subtended to the same MSC. In such a case, the following described inter-MSC signaling is replaced by the appropriate intra-MSC control procedures without departing from the scope of the present invention.

In the present exemplary embodiment, MSC 50 and MSC 60 must support the transcoder handover process and signaling must be performed between these MSCs and their subtended BSC 30 and BSC 40, respectively, using an appropriate BSC-MSC signaling protocol. For example, the Motorola proposed A+ signaling protocol may be used and the following description utilizes messages between MSC 50 and BSC 30 and MSC 60 and BSC 40 typical of such a protocol. MSC 50 and MSC 60 are assumed to be in communication via a portion of communication trunk 65 using an appropriate inter-MSC signaling protocol (e.g. Motorola distributed mobile exchange (DMX) protocol or Electronics Industries Association/Telephony Industries Association (ELA/TIA) Interim Standard-41 (IS-41) protocol).

With reference to FIGS. 3E and 3F, to initiate transcoder handover, BSC 30 decides conditions warrant transfer from it's transcoder 33 to a transcoder, transcoder 43, at BSC 40 and sends a Handover Required message to MSC 50. This message contains the identity of BTS 23, the identity of the communication link and the allocated radio channel being used by BTS 23 to communicate with mobile 80, as well as the identity of mobile 80.

MSC 50, upon receipt of the Handover Required message from BSC 30, conveys the information in the message to MSC 60 in an appropriate inter-MSC signaling message. MSC 50 and MSC 60 will allocate an inter-MSC circuit within communication trunk 65, but not necessarily at this time. Additionally, when MSC 50 and MSC 60 allocate an inter-MSC circuit, this circuit will be connected into a three party connection at switch 52 of MSC 50 with PSTN trunk 66 and the terrestrial circuit 39 to BSC 30.

When MSC 60 receives the inter-MSC signaling message from MSC 50 containing the handover required information, it allocates a terrestrial circuit 49 connected to BSC 40 and sends a Handover Request to BSC 40 containing the terrestrial circuit identification, the identity of BTS 23, the identity of the communication link and the allocated radio channel being used by BTS 23 to communicate with mobile 80, as well as the identity of mobile 80.

Upon receipt of the Handover Request message from MSC 60, BSC 40 establishes a parallel communication link from BTS 23 to mobile 80 by allocating a parallel radio channel in BTS 23 and connecting it via a communication link to transcoder 43. Transcoder 43 is also connected to the terrestrial circuit 49 assigned by MSC 60. The parallel radio channel and transcoder 43 acquire frame synchronization and time align in a known manner. The parallel radio channel is assigned the same Walsh Code as the original radio channel allocated at BTS 23 to service mobile 80. This Walsh Code can be obtained from the Handover Request message, or it may have been obtained by BSC 40 by associating the Handover Request message with stored information within BSC 40 pertaining to this transcoder handover. The parallel radio channel then acquires the mobile 80 uplink transmissions and conveys them to transcoder 43. At this point, however, the parallel radio channel does not yet transmit downlink.

Once the parallel communication link has been set up, BSC 40 sends a Handover Request Acknowledgment to MSC 60, indicating that the resources necessary for the transfer of transcoder functionality are in place. MSC 60 conveys the acknowledgment to MSC 50 via an appropriate inter-MSC signaling message. MSC 50 then sends a Handover Command to BSC 30, and BSC 30 responds by sending a Handover Commenced to MSC 50.

By this point an inter-MSC circuit has been allocated although the specific point in the procedure where this takes place may vary. At MSC 50 the inter-MSC circuit is connected to a three party circuit via switch 52 in MSC 50 to the PSTN trunk 66 and the terrestrial circuit 39 to BSC 30. At MSC 60 this circuit is connected to the terrestrial circuit 49 via switch 62 in MSC 60.

With reference still to FIG. 3F, at BSC 40, the terrestrial circuit 49 is connected to the transcoder 43, and transcoder 43 is connected to BTS 23. Transcoder 43 is receiving CELP data from mobile 80 and is transcoding it into PCM, however, transcoder 43 is set to transmit PCM silent tone toward MSC 60 over the terrestrial circuit 49. In the downlink direction, transcoder 43 is receiving PCM speech from the PSTN trunk 66 via the three party circuit in MSC 50 and is transcoding it and transmitting it as CELP to BTS 23. However, BTS 23 is not transmitting downlink at this point. Thus, the connection to mobile 80 is still being maintained by the transcoder 33 at BSC 30, and the original communication link.

At an agreed upon data frame, e.g., an agreed upon RF interface superframe, the original communication link and associated radio channel ceases transmitting to mobile 80 and sends an indication in the uplink direction to transcoder 33 at BSC 30, indicating that it is to stop transcoding. This message is preferably sent in-band, however, it may alternatively be sent out-of-band. Transcoder 33 stops transcoding and starts to transmit PCM silent tone toward MSC 50 over the terrestrial circuit 39 which is connected to the three party circuit in MSC 50.

At the same agreed upon data frame a parallel communication link and associated radio channel starts transmitting to mobile 80, using the same Walsh Code that the corresponding original communication link and associated radio channel was previously using. The parallel radio channel also sends, preferably in-band but possibly out-of-band, an indication in the uplink direction to transcoder 43 indicating that it is to start transcoding. Transcoder 43 starts transcoding and starts to transmit PCM speech toward MSC 60 over the terrestrial circuit 49 which is connected to the three party circuit in MSC 50 via a connection at switch 62 at MSC 60 and the inter-MSC link. The communication transaction between mobile 80 and the PSTN is now supported by the second, parallel communication transaction from BTS 23, transcoder 43 and BSC 40.

When transcoder 43 receives the in-band indication that the radio channel has started to transmit to mobile 80, transcoder 43 provides an appropriate indication to BSC 40. BSC 40 then sends an Handover Complete message to MSC 60, and releases the original communication link and associated radio channel disconnecting the communication link from the inter-BSC circuit that connected it to transcoder 33 at BSC 30. Also upon receipt of the Handover Complete message from BSC 40, MSC 60 sends a corresponding message, via the inter-MSC link to MSC 50. MSC 50 uses appropriate MSC-BSC signaling to inform BSC 30 that it can release the communication links formally supporting the first communication transaction. MSC 50 also breaks the three party connection and makes a two-way connection between the PSTN trunk 66 and the inter-MSC trunk 65.

With reference to FIG. 3G, the original communication transaction associated with transcoder 33 at BSC 30, and the required communication resources, have been released, as well as the inter-BSC circuit that connected the communication link to transcoder 33 at BSC 30. Also, released is terrestrial circuit 39 that connected transcoder 33 at BSC 30 to MSC 50 thus resulting in a freeing-up of communications resources. Hence a handover of communication control was effected between transcoders servicing communication cells with minimal disruption to the communication system user.

The foregoing description of a preferred embodiment of the present invention is only exemplary of the broad teachings of the present invention. One will appreciate that the present invention provides for an efficient use of communications resources without undue disruption in the services provided to the communication system use. Many additional features and advantages of the present invention will be readily appreciated and its fair scope ascertained from the subjoined claims.

We claim:

1. A method of communication handover from a first transcoder associated with a first base station controller to a second transcoder associated with a second base station controller, the method comprising the steps of:

coupling a mobile communication unit to the first transcoder via a communication channel between the mobile communication unit and a base station associated with the second base station controller by establishing a communication link from the mobile communication unit through the second base station controller to the first transcoder, wherein the communication link does not utilize the second transcoder associated with the second base station controller;

establishing a communication link between the first transcoder and a first mobile switch;

establishing a parallel communication link from the second transcoder to the first mobile switch;

establishing a communication link between the second transcoder and the base station; and coupling the mobile communication unit to the first mobile switch via the communication link between the second transcoder and the first mobile switch and substantially simultaneously decoupling the mobile communication unit from the first transcoder via the communication link between the base station and the first transcoder.

2. The method of claim 1 wherein the step of establishing a communication link between the second transcoder and the base station further comprises assigning a second communication channel between the mobile communication unit and the base station.

3. The method of claim 1 wherein the step of establishing a communication link from the second transcoder to the first mobile switch comprises establishing a communication link between the second transcoder and a second mobile switch and linking the first and second mobile switches.

4. The method of claim 1 comprising executing the step of coupling the mobile communication unit to the first mobile switch via the communication link between the second transcoder upon occurrence of a transfer data frame.

5. The method of claim 1 further comprising disabling the communication link between the base station and the first transcoder and the communication link between the first transcoder and the first mobile switch.

6. A method of soft handover in a cellular radiotelephone communication system having a first base station and a second base station serviced by a first transcoder and a second transcoder, respectively, the first transcoder and the second transcoder each being located within a first base station controller and a second base station controller, respectively, and the first transcoder and the second transcoder being coupled to a first mobile switch and a second mobile switch, respectively, the first mobile switch and the second mobile switch each being further coupled to a public switched telephone network, and a communication unit coupled to the first mobile switch via a communication channel between the communication unit and the first base station, a communication link between the first base station and the first transcoder and a communication link between the first transcoder and the first mobile switch, the method comprising:

(a) determining that the communication unit should enter a soft handover mode with the first base station and the second base station;

(b) assigning a communication channel between the second base station and the communication unit;

(c) establishing a communication link extending through the second base station controller between the second base station and the first transcoder wherein the communication link does not extend through the second transcoder;

(d) selecting at the first transcoder between a first signal on the communication link between the first base station and the first transcoder and a second signal on the communication link between the second base station and the first transcoder;

(e) decoupling the communication unit from the first mobile switch via the communication channel between the communication unit and the first base station, the communication link between the first base station and the first transcoder and the communication link between the first transcoder and the first mobile switch;

(f) determining that transcoding function is passed to the second transcoder;

(g) assigning a second communication channel between the second base station and the communication unit;

(h) establishing a communication link between the second base station and the second transcoder;

(i) establishing a communication link between the second transcoder and the second mobile switch;

(j) establishing an inter-switch communication link between the first mobile switch and the second mobile switch; and (k) substantially simultaneously coupling the communication unit to the first mobile switch via the communication link between the second transcoder and the second mobile switch and the inter-switch communication link and decoupling the communication unit from the first mobile switch via the communication link between the first transcoder and the first mobile switch.

7. The method of claim 6 wherein the cellular radiotelephone communication system further comprises a third base station serviced by the second transcoder and the method further comprises before the step of selecting at the first transcoder, the steps of:

(i) assigning a communication channel between the third base station and the communication unit;

(ii) establishing a communication link between the third base station and the first transcoder via the second base station controller;

and the step of selecting at the first transcoder further comprises:

(d) selecting at the first transcoder between a first signal on the communication link between the first base station and the first transcoder, a second signal on the second communication link between the second base station and the first transcoder and a third signal on the communication link between the third base station and the first transcoder.

8. The method of claim 7 further comprising, before the step of establishing an inter-switch communication link, the steps of:

(i) assigning a communication channel between the third base station and the communication unit; and (ii) establishing a communication link between the third base station and the second transcoder.

9. An apparatus for handover from a first transcoder associated with a first base station controller to a second transcoder associated with a second base station controller, the apparatus comprising:

means for coupling a mobile communication unit to the first transcoder via a communication channel between the mobile communication unit and a base station associated with the second base station controller by establishing a communication link from the mobile communication unit through the second base station controller to the first transcoder, wherein the communication link does not utilize the second transcoder associated with the second base station controller;

means for establishing a communication link between the first transcoder and a first mobile switch;

means for establishing a parallel communication link from the second transcoder to the first mobile switch;

means for establishing a communication link between the second transcoder and the base station; and means for coupling the mobile communication unit to the first mobile switch via the communication link between the second transcoder and the first mobile switch and substantially simultaneously decoupling the mobile communication unit from the first transcoder via the communication link between the base station and the first transcoder.

10. The apparatus of claim 9 wherein the communication link between the second transcoder and the base station further comprises a second communication channel between the mobile communication unit and the base station.

11. The apparatus of claim 9 wherein communication system further comprises a second mobile switch and the communication link from the second transcoder to the first mobile switch comprises a communication link between the second transcoder and the second mobile switch and a communication link between the first and second mobile switches.

12. The apparatus of claim 9 wherein the communication channel comprises a CDMA communication channel.

13. The apparatus of claim 9 wherein the means for coupling is operable upon occurrence of a transfer event.

14. The apparatus of claim 13 wherein the transfer event comprises a transfer data frame.

15. The apparatus of claim 9 further comprising means for disabling the communication link between the base station and the first transcoder and the communication link between the first transcoder and the first mobile switch.

16. The apparatus of claim 9 wherein the communication system further comprises a second base station associated with the second transcoder and wherein the communication link between the second transcoder and the base station further comprises a communication link between the second transcoder and the second base station and the mobile communication unit is further coupled by a communication channel to the second base station.

17. A communication system comprising:
- a base station, including radio frequency circuitry for communicating with a mobile communication unit;
- a first transcoder associated with a first base station controller;
- a second transcoder associated with a second base station controller;
- a first mobile switch, coupled to the first and second transcoders; and
- a switch coupling the base station via a first communication path comprising the second base station controller and the first transcoder to the mobile switch, and via a second communication path comprising the second transcoder to the mobile switch, wherein the first communication path extends through the second base station controller without extending through the second transcoder.

18. The communication system of claim 17 further comprising a second mobile switch, the second mobile switch being coupled to the first mobile switch and the second communication path further comprising the second mobile switch.

19. The communication system of claim 17 wherein a signal on the first communication path is an active signal and a signal on the second communication path is a muted signal.

20. The communication system of claim 17 wherein a signal on the first communication path is a muted signal and a signal on the second communication path is an active signal.

21. The communication system of claim 17 wherein the first signal path further comprises a communication channel from the base station to the mobile communication unit.

22. The communication system of claim 17 wherein the second signal path further comprises a communication channel from the base station to the mobile communication unit.

* * * * *